United States Patent [19]

Heule

[11] Patent Number: 5,288,184
[45] Date of Patent: Feb. 22, 1994

[54] DEBURRING TOOL WITH ADDITIONAL CUTTING TOOL

[76] Inventor: Heinrich Heule, Kristallstrasse 6, Au, Switzerland

[21] Appl. No.: 970,154

[22] Filed: Nov. 2, 1992

[30] Foreign Application Priority Data

May 23, 1992 [DE] Fed. Rep. of Germany ... 9207000[U]

[51] Int. Cl.⁵ ............................................. B23B 51/00
[52] U.S. Cl. .................... 408/224; 408/147; 408/189
[58] Field of Search ............... 408/223, 224, 225, 93, 408/187, 190, 713, 189, 181, 182, 233, 147; 407/45

[56] References Cited

U.S. PATENT DOCUMENTS

| | | | |
|---|---|---|---|
| 1,324,459 | 12/1919 | Maier | 408/182 |
| 2,253,028 | 8/1941 | Hassig | 407/45 |
| 2,373,474 | 4/1945 | Heyer | 408/224 |
| 2,815,688 | 12/1957 | Forkes et al. | 408/183 |
| 4,533,285 | 8/1985 | Jorgensen | 408/224 |

FOREIGN PATENT DOCUMENTS

| | | | |
|---|---|---|---|
| 2344136 | 3/1975 | Fed. Rep. of Germany | 408/190 |
| 1397192 | 5/1988 | U.S.S.R. | 408/187 |
| 24878 | of 1895 | United Kingdom | 408/224 |
| 2248200 | 4/1992 | United Kingdom | 408/187 |

Primary Examiner—Daniel W. Howell
Attorney, Agent, or Firm—Brown, Martin, Haller & McClain

[57] ABSTRACT

A deburring tool for deburring bore edges of bores consists of a rotating tool holder on which one or more radially adjustable cutting knives are arranged. To ensure universal application of the deburring tool, additional cutting tools are arranged on the tool holder in axial distance from the known cutting knives so that additional chamfers and plane surfaces in the area of and outside the bore can be machined. Also, a drill or milling cutter can be connected to the tool holder on the front side of the tool holder.

8 Claims, 3 Drawing Sheets

DEBURRING TOOL WITH ADDITIONAL CUTTING TOOL

BACKGROUND OF THE INVENTION

Object of the present invention is a deburring tool in accordance with the introductory part of Patent claim 1. Such deburring tools are known in various variants for patents of the same applicant. Characteristic of such deburring tools is that either are able to deburr the upper bore edge when penetrating a through-hole and deburr the rear bore edge.

When passing through the through-hole, the movable cutting knives are moved radially inward in the tool holder in order to avoid an undesired machining of the inner surface of the through-hole.

The use of such deburring tools has shown that it would be advantageous to carry out additional operations on bores with such a deburring tool in order to make the scope of application of the known deburring tool more universal.

SUMMARY OF THE INVENTION

In other words, task of the present invention is to further develop a deburring tool of the previously described type so that several different operations can be carried out successively on one bore (pocket bore or through-hole).

In order to solve this task, the innovation is characterized by the technical theory of claim 1.

Significant feature of the invention is that actually known movable cutting knives of the deburring tool are now combined with other cutting tools which allow for additional cutting and deburring operations in any areas of the bore.

In a first variant of the invention the cutting tools are arranged in the direction of feed behind the movable cutting knives of the deburring tool so that the additional cutting and deburring operations occur in the direction of feed of the tool holder on the front of the bore.

In a further development of the present invention, additional cutting tools are arranged in the direction of feed before the known cutting knives. Such cutting tools can be for example a drill or cutting knife which—as mentioned earlier—are arranged in the direction of feed before the known cutting knives. This offers the advantage that in the direction of feed of the tool holder first the drill arranged at the tip of the tool holder for example is activated and machines the bore accordingly, after which the known radially movable cutting knives are activated.

Afterwards, the cutting tools arranged behind the known cutting knives, can additionally be activated.

In other words, the present invention reflects the principle that in the direction of feed before the known cutting knives as well as in the direction of feed behind the known cutting knives additional cutting tools are arranged on the tool holder which are cutting plates, drills, milling cutters, grinding tools or such. This significantly extends the scope of application of the deburring tool in accordance with the invention because additional cutting tools are now used in addition to the known deburring of bore edges of pocket or through-holes.

The cutting tools mentioned previously can be used for any cutting machining of bore surfaces or bore edges.

In a preferred embodiment of the invention for example, chamfer knives are used which chamfer the bore edge up front in the direction of feed.

Cutting tools in the form of flat knives can also be used which can machine plane surfaces inside or outside the bore.

Object of the present invention is not only the result of the object of the individual patent claims but also of the combination of individual patent claims.

All features and characteristics disclosed in the documentation—including the summary—in particular the arrangement shown in the drawings are claimed as essential to the invention to the extent that jointly or severally they are new in terms of existing technology.

BRIEF DESCRIPTION OF THE DRAWINGS

The following is a more detailed description of the invention through drawings which illustrate several variants. The drawings and their description disclose additional essential characteristics and advantages of the invention.

DETAILED DESCRIPTION OF THE PREFERRED EMBODIMENT

Figure 1:
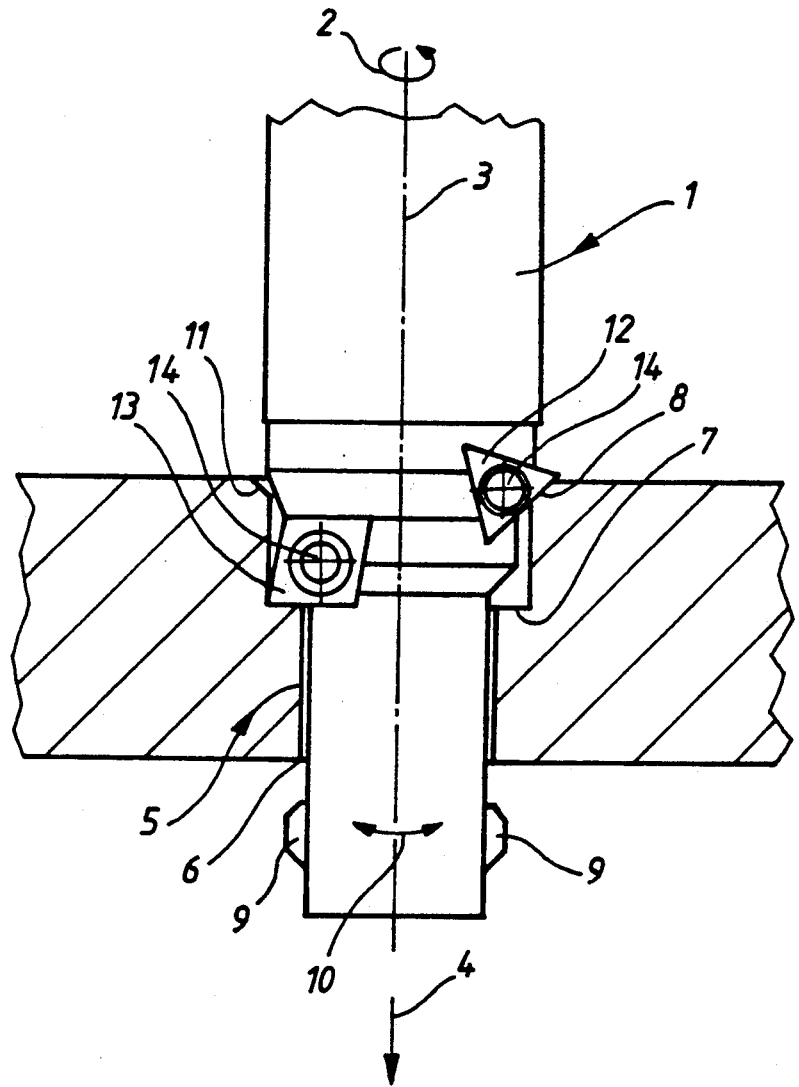
FIG. 1 shows a deburring tool in accordance with the invention while using the cutting tool in accordance with the invention.

In accordance with FIG. 1, a tool holder 1 is driven in a rotating fashion around its longitudinal axis 3 in the direction of arrow 2 for example.

As known, the tool holder 1 features a shaft 21 of reduced diameter, in which adjustable cutting knives 9 are arranged, adjustable radially outward in the direction of arrow 10 or in opposite direction radially inward.

In the position in accordance with Figure I, the deburring tool has already travelled through a step bore 5 (through-bore) whereby the cutting knives 9 were driven in opposite direction to the marked directions of arrow 10 when driving the deburring tool in the direction of feed 4 through the step bore 5 so that the cutting knives do not undesirably machine the inner surfaces of the step bore 5.

The variant example shows additional cutting tools 12, 13 attached to the tool holder at an axial distance behind the cutting knives 9. The reciprocal distance 18 (FIG. 3) between the cutting tools 12, 13 has been selected so that in the engagement position shown in FIG. 1 the upper cutting tool 12 designed as chamfer knife provides the upper bore edge 8 with a slanted chamfer while the lower cutting tool 13 designed as a plane knife machines a plane surface 7 in the area of the step bore 5.

The lower bore edge 6 of the step bore 5 is not yet machined.

Figure 2:
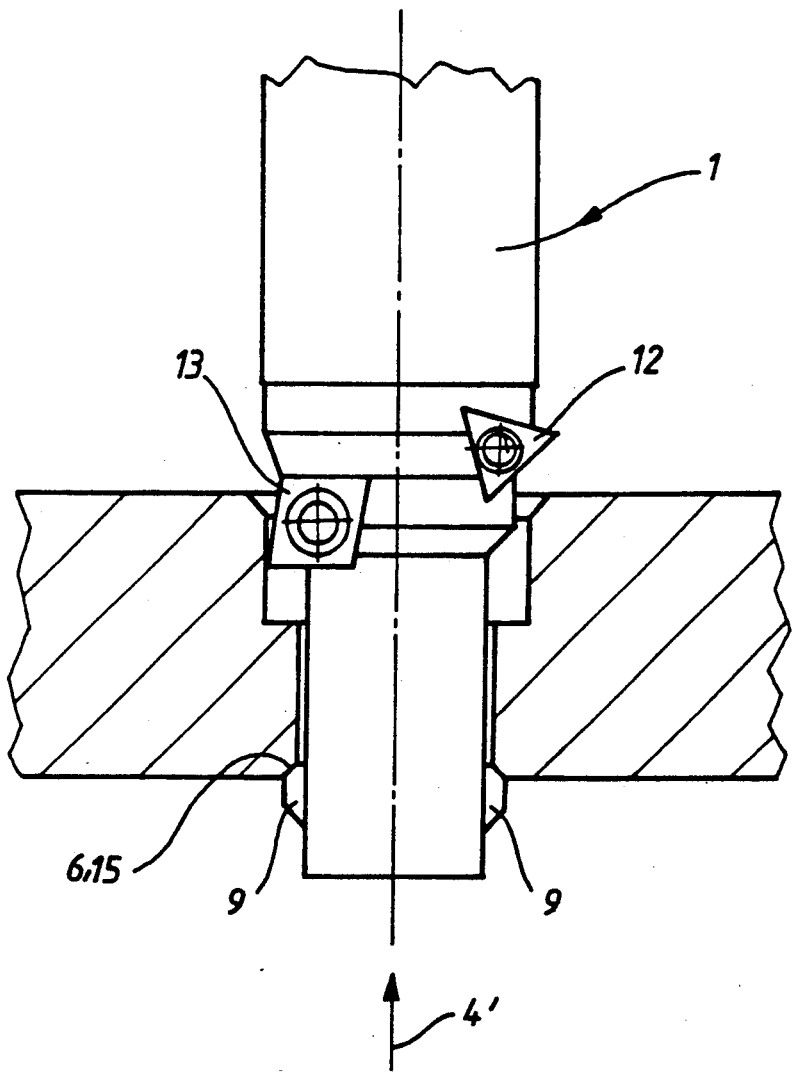
FIG. 2 shows the deburring tool in accordance with FIG. 1 in reverse lift.

After completed machining of the upper bore edge 8 by the cutting tool 12, and of the plane surface 7 by the cutting tool 13, the deburring tool exits the step bore 5 in accordance with FIG. 2 in the direction of arrow 4' opposite the direction of feed 4 whereby the cutting tools 12, 13 become disengaged from the surfaces to be machined.

At the same time, the cutting knives 9 now engage the lower bore edge 6 and provide a corresponding chamfer 15.

Figure 3:
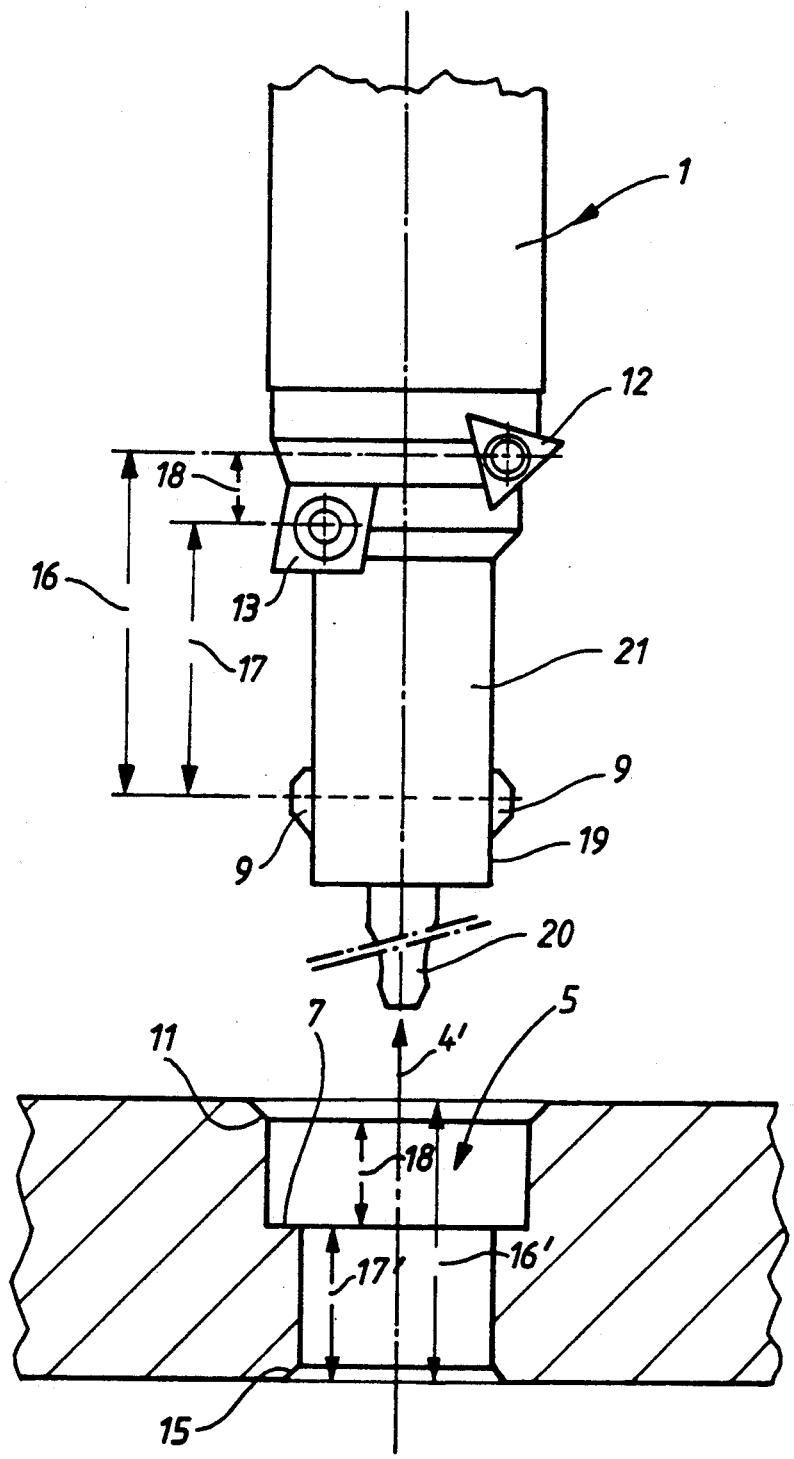
FIG. 3 shows the deburring tool in accordance with FIGS. 1 and 2 after exiting the through-hole with the arrangement of additional cutting tools.

The cutting knives 9 are then moved radially inward in the shaft 21 in the direction opposite to the direction of arrow 10 and maintained until the deburring tool has exited the step bore 5 in accordance with FIG. 3 in the direction of arrow 4'.

It must be mentioned that the cutting tools 12, 13 are attached to the tool holder 1 in corresponding holders 14 and that they are exchangeable.

Another variant shown in FIG. 3 offers the possibility to add cutting tools 20 on the front side of the shaft 21 whereby these cutting tools 20 are designed for example as drills or chamfers.

It is also possible to arrange additional cutting tools underneath the cutting knife 9, approximately in position 19, e.g. cutting tools like the cutting tools 12 or 13 shown, in order to guarantee a corresponding machining of the step bore in the direction of feed 4.

The distance 16 of the cutting tool 12 from the cutting knife 9 has been selected greater than the distance 16' from the upper bore edge 8 to the lower bore edge 6 in order to ensure the cutting knives 9 engage the lower bore edge 6 in accordance with FIG. 2 only in reverse lift (direction of arrow 4') while the cutting tools 12 are already disengaged from the upper bore edge 8.

Similarly, this applies also to the distances 17, 17' in terms of the cutting tool 13.

Overall, the deburring tool in accordance with the invention offers a universal application, i.e. additional burr-removing machining operations can be carried out on the step bore 5 in addition to the deburring of corresponding bore edges with the known cutting knife 9.

Naturally, the cutting tools 12, 13, 20 shown are examples only. Instead of one cutting tool 12 or 13, several can be arranged and evenly distributed at the perimeter of the tool holder 1. Naturally, it is also possible to arrange the cutting tools on different radii on the tool holder 1 as shown by way of example in FIG. 3. The cutting tools 1, 13 are designed preferably as spiral separating plates in order to ensure optimum service life.

I claim:

1. Deburring tool for deburring the edges of bores, comprising:
    a rotating tool holder having a longitudinal axis and a forward end facing in a first feed direction of the tool holder;
    at least one radially moveable first cutting knife located at a first position on said rotating tool holder adjacent the forward end of the tool holder;
    a first additional cutting tool axially spaced at a second axial distance from the first cutting knife between the first cutting knife and first additional cutting tool;
    the first and second additional cutting tools comprising means for machining a first end of a bore to be deburred and a surface spaced from said first end, respectively, as the tool holder is moved in said first feed direction partially through said bore; and
    said first cutting knife comprising means for machining an outer circumferential edge of a second, opposite end of the bore as the tool holder is moved back through the bore in a second direction opposite to said first direction.

2. The tool as claimed in clam 1, wherein said first cutting knife comprises chamfer means for chamfering the outer circumferential edge of the second end of a bore.

3. The tool as claimed in claim 1, including securing means for rigidly securing the additional cutting tools to the tool holder and preventing radial movement of the additional tools.

4. The tool as claimed in claim 1, wherein the second additional cutting tool comprises means for machining a surface in the bore to be deburred located between opposite first and second ends of the bore in the first fed direction, the second axial distance being equal to or greater than the distance between the surface and the second end of the bore.

5. The tool as claimed in claim 4, wherein the second additional cutting tool is located between the first additional cutting tool and first cutting knife and comprises a plane knife.

6. The tool as claimed in claim 1, including a further additional cutting tool on said tool holder located in front of the first cutting knife in the first feed direction.

7. The tool as claimed in claim 6, wherein the further additional cutting tool is located at the front end of the tool holder and comprises a drill.

8. The tool as claimed in claim 1, wherein the first additional cutting tool comprises a chamfer knife.

* * * * *

UNITED STATES PATENT AND TRADEMARK OFFICE
CERTIFICATE OF CORRECTION

PATENT NO. : 5,288,184
DATED : FEBRUARY 22, 1994
INVENTOR(S) : HEULE, Heinrich

It is certified that error appears in the above-indentified patent and that said Letters Patent is hereby corrected as shown below:

Column 4, line 9, after "spaced", delete to the end of paragraph on line 12 and insert -- at a first axial distance rearwardly of the first cutting knife in the first feed direction, the first axial distance being equal to or greater than the depth of the bore to be deburred;--.

Immediately below insert:
    -- a second additional cutting tool axially spaced at a second axial distance from the first cutting knife between the first cutting knife and first additional cutting tool; --.

Column 4, line 34, delete "fed" and insert -- feed --.

Signed and Sealed this

Ninth Day of August, 1994

BRUCE LEHMAN

Attest:

Attesting Officer

Commissioner of Patents and Trademarks